(12) United States Patent
Sakakima

(10) Patent No.: US 11,184,557 B2
(45) Date of Patent: Nov. 23, 2021

(54) IMAGE GENERATING SYSTEM, IMAGE GENERATION METHOD, CONTROL APPARATUS, AND CONTROL METHOD

(71) Applicant: CANON KABUSHIKI KAISHA, Tokyo (JP)

(72) Inventor: Eito Sakakima, Kamakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/778,279

(22) Filed: Jan. 31, 2020

(65) Prior Publication Data

US 2020/0267329 A1 Aug. 20, 2020

(30) Foreign Application Priority Data

Feb. 14, 2019 (JP) .............................. JP2019-024695

(51) Int. Cl.
*H04N 5/247* (2006.01)
*H04N 5/232* (2006.01)

(52) U.S. Cl.
CPC ......... *H04N 5/247* (2013.01); *H04N 5/23203* (2013.01); *H04N 5/23216* (2013.01)

(58) Field of Classification Search
None
See application file for complete search history.

(56) References Cited

U.S. PATENT DOCUMENTS

| 9,445,081 B1* | 9/2016 | Kouperman | G06T 7/38 |
| 10,405,009 B2* | 9/2019 | Pasko | H04N 21/21805 |
| 2002/0049979 A1* | 4/2002 | White | H04N 21/4314 |
| | | | 725/87 |
| 2005/0083333 A1* | 4/2005 | Gordon | G06K 9/00255 |
| | | | 345/475 |
| 2009/0290848 A1* | 11/2009 | Brown | H04N 5/262 |
| | | | 386/223 |
| 2015/0304629 A1* | 10/2015 | Zhang | H04N 13/20 |
| | | | 348/48 |
| 2016/0050396 A1* | 2/2016 | Gali | H04N 7/181 |
| | | | 348/159 |
| 2017/0318275 A1* | 11/2017 | Khalid | H04N 13/122 |
| 2017/0322017 A1* | 11/2017 | Aoki | G01B 11/03 |
| 2018/0098047 A1 | 4/2018 | Itakura | |
| 2020/0098122 A1* | 3/2020 | Dal Mutto | G06T 19/003 |
| 2020/0145644 A1* | 5/2020 | Cordes | H04N 5/23238 |

FOREIGN PATENT DOCUMENTS

JP    2018056971 A    4/2018

* cited by examiner

*Primary Examiner* — James M Hannett
(74) *Attorney, Agent, or Firm* — Rossi, Kimms & McDowell LLP

(57) ABSTRACT

A control station manages a set of a plurality of camera groups to which a plurality of cameras belong, determines respectively different reference times for the plurality of camera groups, and controls the plurality of cameras such that the cameras that respectively belong to the plurality of camera groups execute capturing according to the determined reference times.

18 Claims, 12 Drawing Sheets

FIG. 5A

| CAMERA NUMBER | CAMERA GROUP ID | |
|---|---|---|
| | FRAME RATE: 60Hz | FRAME RATE: 120Hz |
| 301 | A | A |
| 302 | A | B |
| 303 | A | A |
| 304 | A | B |
| 305 | A | A |
| 306 | A | B |
| 307 | A | A |
| 308 | A | B |
| 309 | A | A |
| 310 | A | B |
| 311 | A | A |
| 312 | A | B |

FIG. 6

| GROUP | REFERENCE TIME ||
|---|---|---|
| | FRAME RATE: 60Hz | FRAME RATE :120Hz |
| A | 16.6×N+0msec | 16.6×N+0msec |
| B | — | 16.6×N+8.3msec |

IMAGE GENERATING SYSTEM, IMAGE GENERATION METHOD, CONTROL APPARATUS, AND CONTROL METHOD

BACKGROUND OF THE INVENTION

Field of the Invention

The present invention relates to an image generating system that generates a virtual viewpoint image using captured images from a plurality of cameras, an image generation method, a control apparatus, and a control method.

Description of the Related Art

Recently, attention has been paid to a technique in which a plurality of cameras are installed at different positions to perform synchronous capturing from multiple viewpoints, and virtual viewpoint content is generated using a plurality of images obtained by the capturing. According to the technique of generating virtual viewpoint content from a plurality of images, for example, a highlight scene for soccer or basketball can be viewed from various angles, so that a user can be given a high sense of presence as compared with a normal image. Such virtual viewpoint content is generated by aggregating images captured by a plurality of cameras to an image generating apparatus such as a server, and performing processing such as three-dimensional model generation and rendering on the image generating apparatus. The generated virtual viewpoint content is delivered from the image generating apparatus to a user terminal and is viewed by the user.

The image quality of virtual viewpoint content basically depends on the number of cameras used for capturing. However, the number of cameras that can be installed is limited from the viewpoints of restrictions on the installation location and cost. In order to generate high-quality virtual viewpoint content, it is important to appropriately arrange cameras from among a number of cameras that can be installed. Japanese Patent Laid-Open No. 2018-056971 proposes that a plurality of cameras are assigned to a plurality of camera groups to perform capturing, and each camera group covers a different image capturing area, thereby making it possible to generate virtual viewpoint content covering the entirety of a wide range of image capturing targets.

For example, when an image capturing area is not wide, there is a possibility that it is unnecessary to divide the capturing into a plurality of camera groups, and as a result, there is a problem that the capturing by the plurality of camera groups is not effectively used.

SUMMARY OF THE INVENTION

The present invention proposes a new method of utilizing a plurality of camera groups in the generation of a virtual viewpoint image, and provides a technique capable of generating a virtual viewpoint image at a frame rate equal to or higher than the frame rate of a camera by using a plurality of cameras.

According to one aspect of the present invention there is provided a control apparatus, comprising: a management unit configured to manage a plurality of groups to which a plurality of image capturing apparatuses belong; a determining unit configured to determine respectively different reference times for the plurality of groups managed by the management unit; and a control unit configured to control the plurality of image capturing apparatuses that belong to the plurality of groups so that the plurality of image capturing apparatuses execute image capturing according to the reference times determined by the determining unit.

According to another aspect of the present invention there is provided an image generating system, comprising: a management unit configured to manage a plurality of groups to which a plurality of image capturing apparatuses belong: a determining unit configured to determine respectively different reference times for the plurality of groups managed by the management unit; a control unit configured to control the plurality of image capturing apparatuses that belong to the plurality of groups so that the plurality of image capturing apparatuses execute image capturing according to the reference times determined by the determining unit; and a generating unit configured to generate an image corresponding to a designated viewpoint based on images obtained by the plurality of image capturing apparatuses.

According to another aspect of the present invention there is provided a control method, comprising: determining respectively different reference times for a plurality of groups to which a plurality of image capturing apparatuses belong; and controlling the plurality of image capturing apparatuses that belong to the plurality of groups so that the plurality of image capturing apparatuses execute image capturing according to the determined reference times.

According to another aspect of the present invention there is provided an image generation method, comprising: determining respectively different reference times for a plurality of groups to which a plurality of image capturing apparatuses belong; controlling the plurality of image capturing apparatuses that belong to the plurality of groups so that the plurality of image capturing apparatuses execute image capturing according to the determined reference times; and generating an image corresponding to a designated viewpoint based on images obtained by the plurality of image capturing apparatuses.

According to another aspect of the present invention there is provided a non-transitory computer-readable medium storing programs for causing a computer to execute a control method, wherein the control method comprising: determining respectively different reference times for a plurality of groups to which a plurality of image capturing apparatuses belong; and controlling the plurality of image capturing apparatuses that belong to the plurality of groups so that the plurality of image capturing apparatuses execute image capturing according to the determined reference times.

Further features of the present invention will become apparent from the following description of exemplary embodiments with reference to the attached drawings.

BRIEF DESCRIPTION OF THE DRAWINGS

FIG. 5A is a diagram illustrating an example of a table for determining a camera group.

FIG. 6 is a diagram for describing a reference time of a camera group.

DESCRIPTION OF THE EMBODIMENTS

Figure 1:
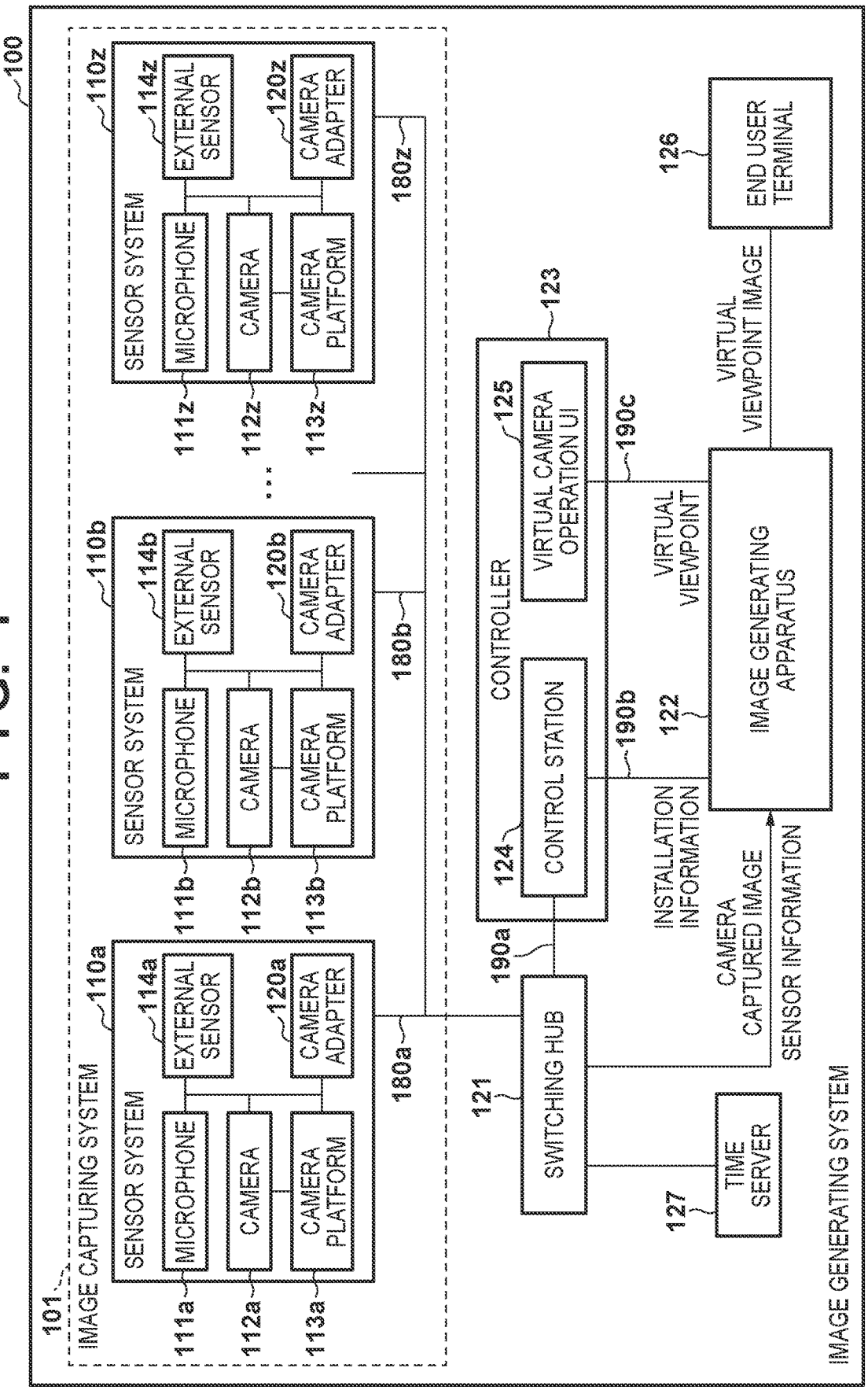
FIG. 1 is a block diagram illustrating an example of a configuration of an image generating system according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The first embodiment illustrates an image generating system that performs capturing by two camera groups and generates a virtual viewpoint image. The image generating system according to the first embodiment improves the frame rate of the obtained virtual viewpoint image by varying the reference time (image capturing time) of each camera group.

FIG. 1 is a block diagram illustrating an example of a configuration of an image generating system according to a first embodiment. The image generating system generates a virtual viewpoint image by image capturing and audio collection using a plurality of cameras and microphones installed in a sports field (stadium) or a facility such as a concert hall. Hereinafter, an image generating system according to the first embodiment will be described with reference to FIG. 1.

An image generating system 100 includes sensor systems 110*a* to 110*z*, an image generating apparatus 122, a controller 123, a switching hub 121, an end user terminal 126, and a time server 127. Hereinafter, a set of the sensor systems 110*a* to 110*z* will be described as an image capturing system 101.

The controller 123 includes a control station 124 and a virtual camera operation UI 125. The controller 123, through the networks 180*a* to 180*z* and 190*a* to 190*c*, manages the operation state and controls the parameter setting of each of the blocks configuring the image generating system 100. Here, the networks may be GbE (Gigabit Ethernet) or 10 GbE conforming to an IEEE standard (Ethernet (registered trademark)), or may be configured by combining an interconnect Infiniband, industrial Ethernet, or the like. Further, the networks are not limited to these, and may be of other types.

Next, an operation of transmitting 26 sets of images and audio obtained by the sensor systems 110*a* to 110*z* from the respective sensor systems to the image generating apparatus 122 will be described. In the image generating system 100 of the first embodiment, the sensor systems 110*a* to 110*z* are connected to the image generating apparatus 122 via the switching hub 121.

Note that, in the present embodiment, when it is not necessary to distinguish the sensor systems of the sensor systems 110*a* to 110*z* from each other, the 26 sensor systems may be referred to as the sensor system 110 without distinguishing them from each other. Similarly, the apparatuses in each sensor system 110 may be referred to as a microphone 111, a camera 112, a camera platform 113, an external sensor 114, and a camera adapter 120 when there is no need to distinguish them. In FIG. 1, the number of sensor systems is 26, but this is merely an example, and the number of sensor systems is not limited to this. Note that in this specification, unless otherwise specified, the phrase "image" will be described as including the concept of a moving image and a still image. That is, the image generating system 100 of the present embodiment can process both still images and moving images. In the present embodiment, description is mainly given for an example in which virtual viewpoint content provided by the image generating system 100 includes a virtual viewpoint image and virtual viewpoint audio, but there is no limitation to this. For example, audio does not need to be included in the virtual viewpoint content. Further, for example, the audio included in the virtual viewpoint content may be audio collected by the microphone closest to the virtual viewpoint. In the present embodiment, although the description of the audio is partially omitted for the sake of simplification of the description, it is basically assumed that both the image and the audio are processed.

The sensor systems 110*a* to 110*z* have their own respective camera 112*a* to 112*z*. That is, the image generating system 100 includes a plurality of cameras as a plurality of image capturing apparatuses for capturing a subject from a plurality of directions. The sensor systems 110*a* to 110*z* are connected to the switching hub 121 to configure a star network, and transmit and receive data to and from each other via the switching hub 121.

The sensor system 110 includes a microphone 111, a camera 112, a camera platform 113, an external sensor 114, and a camera adapter 120. Audio collected by the microphone 111 and an image captured by the camera 112 are transmitted to the switching hub 121 via the camera adapter 120. Note that the configuration of the sensor system 110 is not limited to this, and it is sufficient if the sensor system 110 includes at least one camera adapter 120 and one camera 112 or one microphone 111. Further, for example, the sensor system 110 may be configured by one camera adapter 120 and a plurality of cameras 112, or may be configured by one camera 112 and a plurality of camera adapters 120. That is, the plurality of cameras 112 and the plurality of camera adapters 120 in the image generating system 100 correspond to each other in an N to M ratio (where N and M are both integers of 1 or more). The camera 112 and the camera adapter 120 may be integrally configured.

In the present embodiment, it is assumed that the sensor systems 110*b* to 110*z* have the same configuration, but there is no limitation to this, and the respective sensor systems 110 may have different configurations. In the present embodiment, configuration is such that the camera 112 and the camera adapter 120 are separated from each other, but they may be integrated in the same housing. In this case, the microphone 111 may be incorporated in the integrated camera 112, or may be connected to the outside of the camera 112.

The time server 127 has a function of distributing the time and a synchronization signal, and distributes the time and synchronization signal to the sensor systems 110a to 110z via the switching hub 121. The camera adapters 120a to 120z that have received the time and the synchronization signal genlock the cameras 112a to 112z based on the time and the synchronization signal to perform image frame synchronization. That is, the time server 127 synchronizes the image capturing timings of the plurality of cameras 112. As a result, the image generating system 100 can generate a virtual viewpoint image based on a plurality of captured images captured at the same timing, and therefore, it is possible to suppress quality degradation of the virtual viewpoint image due to deviation of image capturing timings. Note that, in the present embodiment, it is assumed that the time server 127 manages the time synchronization of the plurality of cameras 112, but there is no limitation to this, and the individual cameras 112 or the individual camera adapters 120 may independently perform processing for time synchronization.

The image generating apparatus 122 performs processing for generating a virtual viewpoint image based on data (camera captured images) acquired from the sensor system 110. The virtual viewpoint image generated by the image generating apparatus 122 is transmitted to the end user terminal 126. A user who operates the end user terminal 126 can view the virtual viewpoint image and listen to audio in accordance with the designation of the viewpoint. The designation of the viewpoint includes, for example, designation of the position and orientation of the viewpoint. The image generating apparatus 122 acquires, via the end user terminal 126, information on the viewpoint, that is, at least information indicating the position and orientation of the viewpoint. Configuration may be taken such that the viewpoint is not designated by the user, but is automatically designated by the end user terminal 126, the image generating apparatus 122, or the like. Note that, in the present embodiment, an example of a case in which audio data is included in the virtual viewpoint content will be mainly described, but audio data does not necessarily need to be included in the virtual viewpoint content. In addition, the image generating apparatus 122 compresses and encodes the virtual viewpoint image in accordance with a standard technique represented by H.264 or HEVC, and then transmits the virtual viewpoint image to the end user terminal 126 using the MPEG-DASH protocol. The image generating apparatus 122 may also transmit the virtual viewpoint image uncompressed to the end user terminal 126. The former, where compression encoding is performed, assumes a smartphone or tablet as the end user terminal 126, and the latter, where compression encoding is not performed, assumes a display capable of displaying an uncompressed image as the end user terminal 126. That is, the image format of the virtual viewpoint image can be switched according to the type of the end user terminal 126. Further, the transmission protocol of images is not limited to MPEG-DASH, and, for example, HLS (HTTP Live Streaming) or another transmission method may be used.

In the controller 123, the control station 124 controls the entire image generating system 100 and executes various settings for the image generating system 100. In addition, the control station 124 transmits a three-dimensional model (three-dimensional shape data) such as a stadium which is a subject for the generation of a virtual viewpoint image to the image generating apparatus 122 via the network 190b. In addition, the control station 124 performs calibration when the cameras are installed. More specifically, the control station 124 calculates a position, an orientation, and a focal length of the camera 112 in world coordinates based on a captured image obtained by capturing a marker installed on a field that is an image capturing target by the camera 112. The control station 124 transmits the calculated information on the position, orientation, and focal length of each camera to the image generating apparatus 122. The image generating apparatus 122 uses the transmitted three-dimensional model and the information of each camera when generating a virtual viewpoint image.

The virtual camera operation UI 125 of the controller 123 transmits a virtual viewpoint designated in accordance with a user operation to the image generating apparatus 122 via the network 190c. The image generating apparatus 122 generates an image of the designated virtual viewpoint, and transmits the image to the end user terminal 126.

Figure 2:
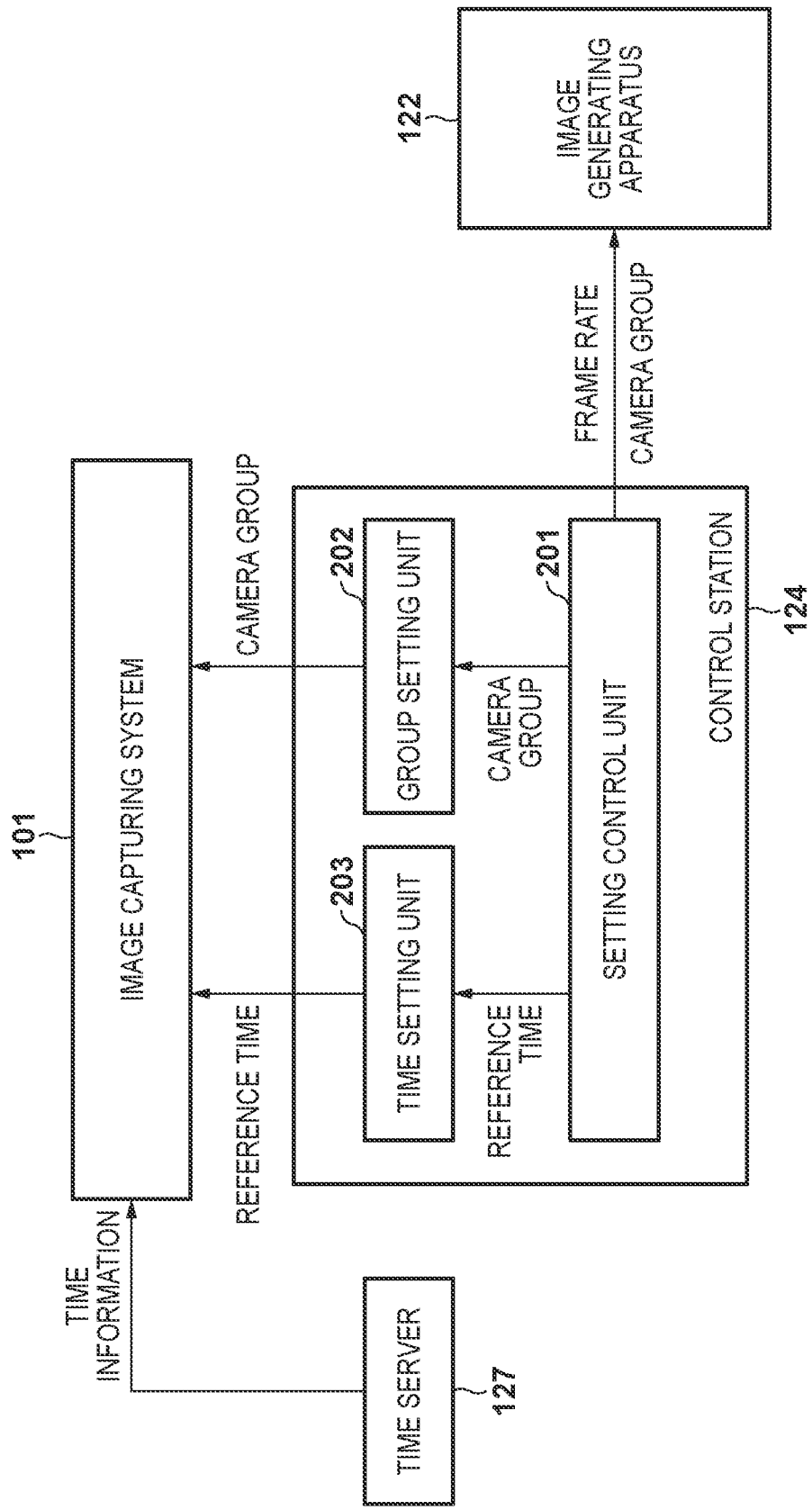
FIG. 2 is a block diagram illustrating an example of a functional configuration of a control station according to the first embodiment.

Next, a functional configuration of the control station 124 according to the first embodiment will be described. FIG. 2 is a block diagram illustrating an example of the functional configuration of the control station 124. The control station 124 is an example of an image capturing control apparatus that controls synchronous capturing of a plurality of cameras.

A setting control unit 201 manages setting information of a virtual viewpoint image generated by the image generating system 100 of FIG. 1, and performs processing to reflect the setting. A specific example of a setting may be a frame rate of a virtual viewpoint image to be generated. The setting control unit 201 manages a set of camera groups to which a plurality of cameras belong (described later with reference to FIG. 5A). The group setting unit 202 groups a plurality of cameras configuring the image capturing system 101 of FIG. 1 based on an instruction from the setting control unit 201. Here, grouping refers to classifying a plurality of cameras into a camera group for capturing according to the same reference time, and setting the camera group that respective cameras belong to (for example, setting IDs of the camera group in the respective cameras). A time setting unit 203 sets a reference time for each camera group set by the group setting unit 202 based on an instruction from the setting control unit 201. In other words, the time setting unit 203 sets a reference time, which is a time at which each camera should execute capturing.

Figure 11:
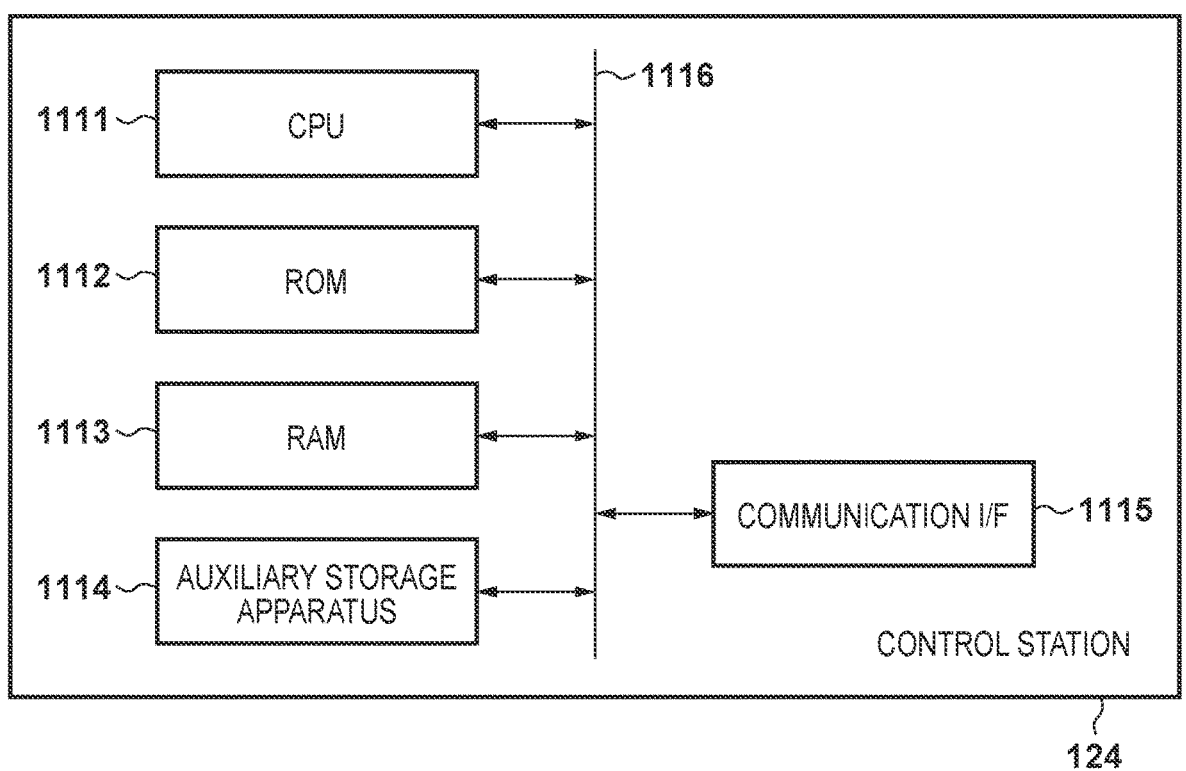
FIG. 11 is a block diagram illustrating an example of a hardware configuration of the control station according to the first embodiment.

The hardware configuration of the control station 124 will be described with reference to FIG. 11. The hardware configuration of the image generating apparatus 122 is also similar to that of the control station 124 described below. The control station 124 includes a CPU 1111, a ROM 1112, a RAM 1113, an auxiliary storage apparatus 1114, a communication I/F 1115, and a bus 1116.

The CPU 1111 implements the functions of the control station 124 illustrated in FIG. 2 by controlling the entire control station 124 using computer programs and data stored in a ROM 1112 and a RAM 1113. Note that configuration may be taken such that the control station 124 has one or more pieces of dedicated hardware differing from the CPU 1111, and the dedicated hardware executes at least a portion of the processing by the CPU 1111.

Examples of dedicated hardware include an Application Specific Integrated Circuit (ASIC), a Field Programmable Gate Array (FPGA), and a Digital Signal Processor (DSP).

The ROM 1112 stores programs and the like that do not need to be changed. The RAM 1113 temporarily stores programs and data supplied from the auxiliary storage apparatus 1114, data supplied from the outside via a communication I/F 1115, and the like. The auxiliary storage apparatus 1114 is configured by, for example, a hard disk drive or the like, and stores various data such as image data and audio data.

The communication I/F 1115 is used for communication with apparatuses external to the control station 124. For example, when the control station 124 is connected by wire to an external apparatus, a communication cable is connected to the communication I/F 1115. If the control station 124 has a function of wirelessly communicating with external apparatuses, the communication I/F 1115 may include an antenna. The bus 1116 communicates information through the various portions of the control station 124.

Figure 3:
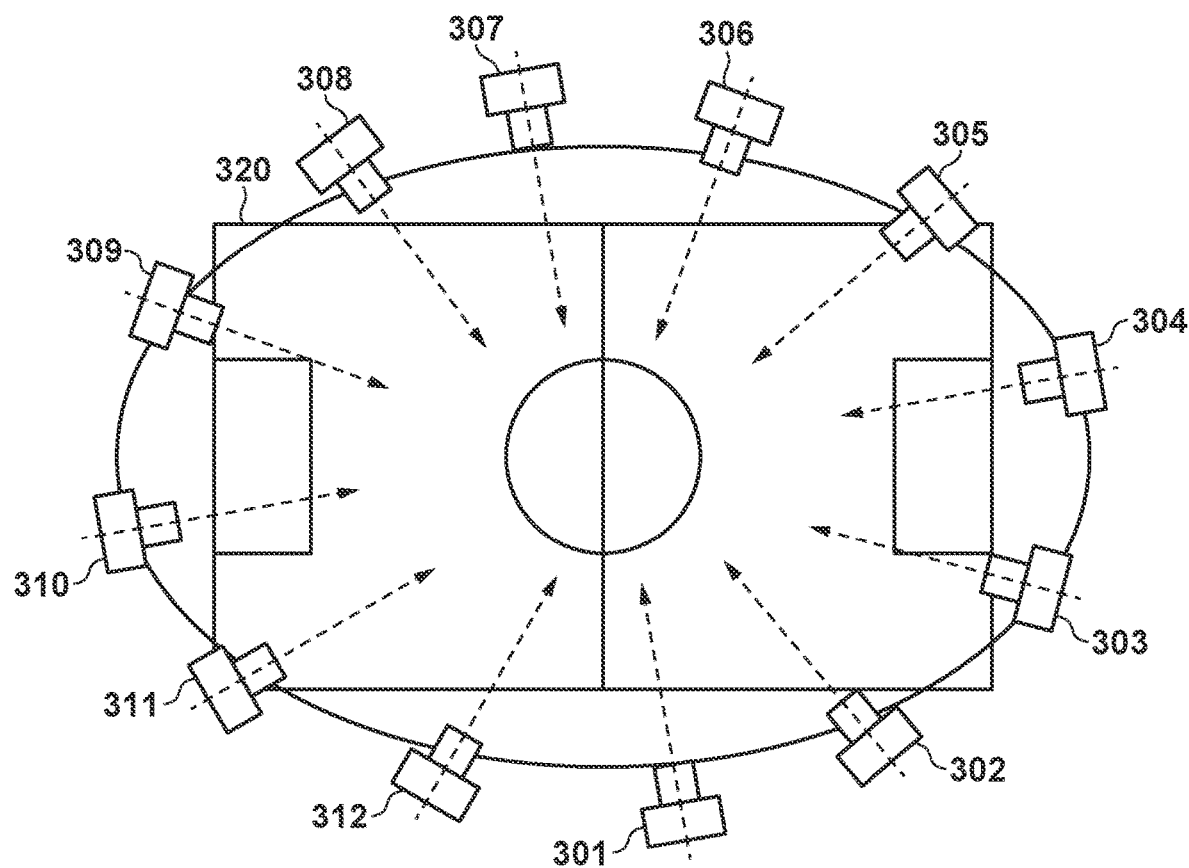
FIG. 3 is a diagram illustrating an example of an arrangement of cameras according to the first embodiment.

Next, the arrangement of the cameras configuring the image capturing system 101 according to the first embodiment will be described. FIG. 3 is a schematic diagram illustrating an example of the arrangement of cameras in a stadium. Description has been given for the configuration in which the image capturing system 101 comprises the cameras 112*a* to 112*z* in FIG. 1, but in FIG. 3, a situation in which twelve cameras: a camera 301 to a camera 312 are arranged as the image capturing system 101 is illustrated. In FIG. 3, a field 320 indicates an image capturing area of the cameras 301 to 310. The cameras 301 to 312 are installed around the field 320, with each camera facing the field 320. Hereinafter, the operation of the first embodiment will be described by assuming the arrangement of the cameras and the number of cameras illustrated in FIG. 3. Note that a camera configuring the image capturing system 101 may be oriented so as to capture a specific position or a specific area. The optical axes of the cameras may or may not intersect at one point.

Figure 4:
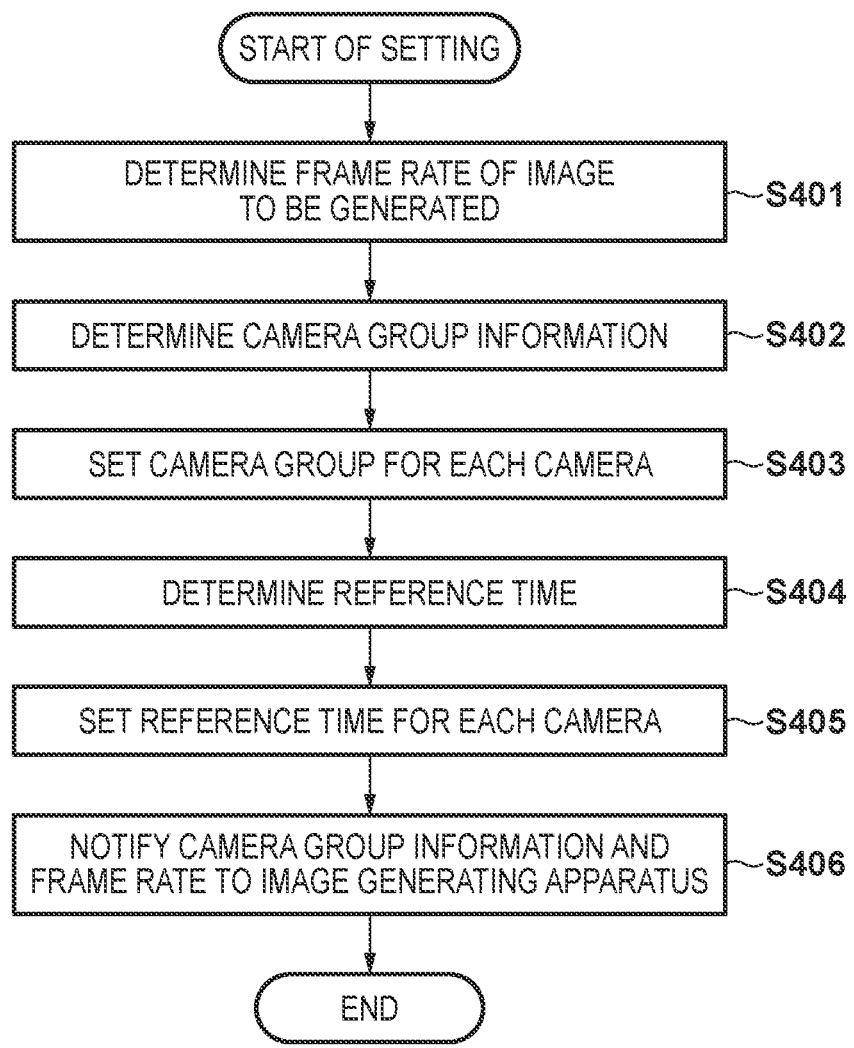
FIG. 4 is a flowchart for describing processing for setting a frame rate according to the first embodiment.

Camera synchronization control according to the first embodiment will be described. FIG. 4 is a flowchart for describing processing for setting the frame rate of the virtual viewpoint image and the synchronization control of the cameras in the first embodiment.

First, in step S401, the setting control unit 201 determines a frame rate of a virtual viewpoint image to be generated. The frame rate of the virtual viewpoint image can be designated by, for example, a user operation. In the present embodiment, the user can designate either 60 Hz or 120 Hz as the frame rate of the virtual viewpoint image. Note that the frame rate may be determined in accordance with a user selection of whether to prioritize image quality or to prioritize frame rate, where the frame rate is made to be 60 Hz when prioritizing image quality and the frame rate is made to 120 Hz when prioritizing frame rate. Next, in step S402, the setting control unit 201 determines camera group information according to the frame rate determined in step S401. As will be described later with reference to FIG. 5A, the setting control unit 201 uses a table to manage sets of camera groups to which a plurality of cameras belong. For example, in FIG. 5A, a set of one camera group to which all cameras belong and a set having two camera groups to which half of the cameras respectively belong are managed. In this manner, the setting control unit 201 realizes a management unit that manages sets of camera groups to which a plurality of cameras belong, using a table of camera groups. Further, in the present embodiment, a plurality of sets of one or a plurality of camera groups, each of which is configured by a different number of camera groups, are managed, and a frame rate corresponding to the number of camera groups is determined for the plurality of sets. This frame rate is used as the frame rate of the virtual viewpoint image. The setting control unit 201 is an example of a configuration that functions as a selecting unit for selecting, from a plurality of sets, a set corresponding to a frame rate designated by a user operation.

In the present embodiment, the setting control unit 201 determines a camera group to be used by selecting a set composed of one camera group when the determined frame rate is 60 Hz, and selecting a set composed of two camera groups when the determined frame rate is 30 Hz. The setting control unit 201 notifies the group setting unit 202 of the determined camera group information. Camera groups will be described in detail later. In step S403, the group setting unit 202 sets the camera groups of the cameras 301 to 312 configuring the image capturing system 101 according to the camera group information notified in step S402. For example, the group setting unit 202 sets a group ID ("A" or "B" in FIG. 5A) in the camera adapters of the cameras 301 to 312.

Next, in step S404, the setting control unit 201 determines the reference time for each camera group according to the frame rate determined in step S401, and notifies the determined reference time to the time setting unit 203. The setting control unit 201 is an example of a configuration that, for each camera group included in a set managed by the above-described management unit, functions as a determination unit for determining a reference time for a camera belonging to the same camera group to perform synchronous capturing. In step S405, the time setting unit 203 sets the reference time of each of the cameras 301 to 312 that configure the image capturing system 101 based on the reference time notified in step S404. The reference time is set, for example, in the camera adapter 120 of the sensor system 110.

In the present embodiment, the group setting unit 202 sets to which of the groups A and B each camera belongs, and the time setting unit 203 sets the reference time of the group A and the reference time of the group B to respective cameras. Each of the cameras selects one of the reference times of the groups A and B according to which of the groups A and B the camera belongs to, and executes capturing. Note that the time setting unit 203 may be configured to set the reference time of the group A to cameras belonging to the group A, and set the reference time of the group B to cameras belonging to the group B. In this case, a camera need only execute capturing in accordance with the set reference time, and it is not necessary to know which of the groups A and B the camera belongs to. Therefore, setting of an ID of the camera group by the group setting unit 202 can be omitted. As described above, the group setting unit 202 and the time setting unit 203 which execute step S403 and step S405 output information for setting the determined reference time to a plurality of cameras. In this manner, the group setting unit 202 and the time setting unit 203 set a plurality of cameras for each of the plurality of camera groups so that the cameras belonging to the camera group execute synchronous capturing in accordance with the determined reference time.

In step S406, the setting control unit 201 notifies the image generating apparatus 122 of the frame rate determined in step S401 and the camera group information determined in step S402. The image generating apparatus 122 generates a virtual viewpoint image in accordance with the notified frame rate and camera group information.

Next, a process in which the setting control unit 201 determines the camera group based on the frame rate will be described. FIG. 5A is a diagram illustrating an example of a data configuration of a table for determining a camera group. Note that, in the first embodiment, an example in which the camera group is determined in accordance with a table 501 will be described, but there is no limitation to this method.

The table 501 indicates to which group each camera belongs according to the frame rate. The setting control unit 201 refers to the table 501 which is prepared in advance to determine a camera group according to a designated frame rate. In the first embodiment, an example is illustrated in which the camera group is determined in two cases: where the frame rate is 60 Hz and where the frame rate is 120 Hz. The table 501 defines a set of camera groups (a set of one camera group A) for when the frame rate is 60 Hz and a set of camera groups (a set of two camera groups A and B) for when the frame rate is 120 Hz. According to the table 501, when the frame rate is 60 Hz, all the cameras are determined to belong to the camera group "A". When the frame rate is 120 Hz, it is determined so that half of the cameras belong to the camera group "A" and the remaining cameras belong to the camera group "B".

Figure 5B:
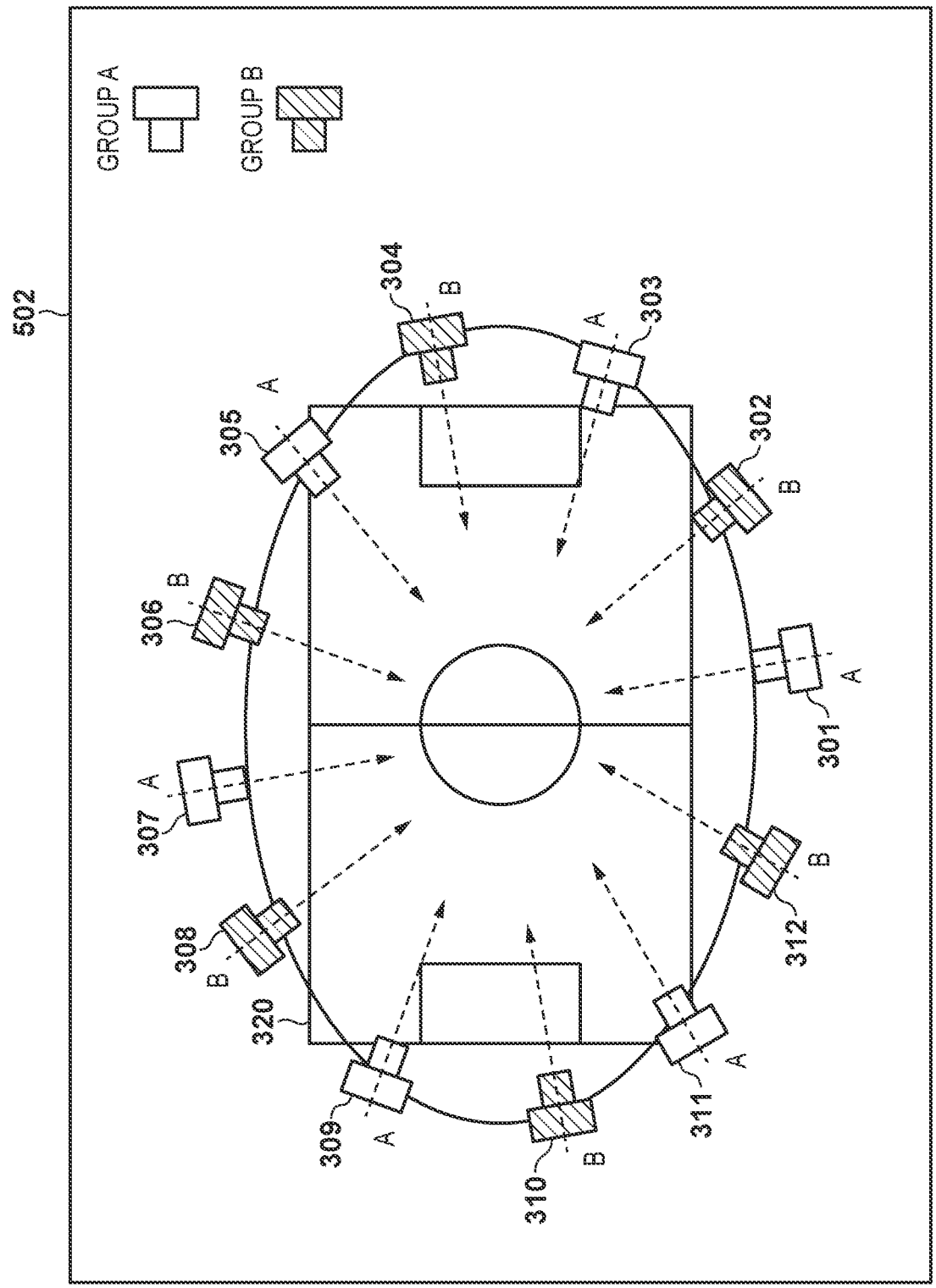
FIG. 5B is a diagram illustrating an example of a classification of camera groups.

An example of grouping of cameras when 120 Hz is designated as the frame rate is schematically illustrated in FIG. 5B. In the camera arrangement described in FIG. 3, cameras 301, 303, 305, 307, 309, 311 belong to camera group A and the rest belong to camera group B. As illustrated in FIG. 5B, by arranging the cameras so that they belong to different camera groups alternating, degradation of the accuracy of the three-dimensional models for the virtual viewpoint images generated by the image generating apparatus 122 is suppressed.

Next, a method of determining the reference time will be described. FIG. 6 is a diagram illustrating a table that the setting control unit 201 refers to in order to determine the reference time for each camera group based on the determined frame rate. Note that, in the present embodiment, an example in which the reference time is determined in accordance with a table 601 will be described, but there is no limitation to this method.

The table 601 illustrates the correspondence between the frame rate and the reference time for each camera group. However, in the table 601, the reference time is illustrated only in units of milliseconds or less. The time is distributed by the time server 127 of FIG. 1, and the cameras belonging to the respective camera groups capture images at the timing of these reference times. For example, when a frame rate of 120 Hz is set, the camera belonging to the camera group A performs capturing every 16.6 milliseconds with a start time of 0 milliseconds, and the camera belonging to the camera group B performs capturing every 16.6 milliseconds with a start time of 8.3 milliseconds.

Figure 7:
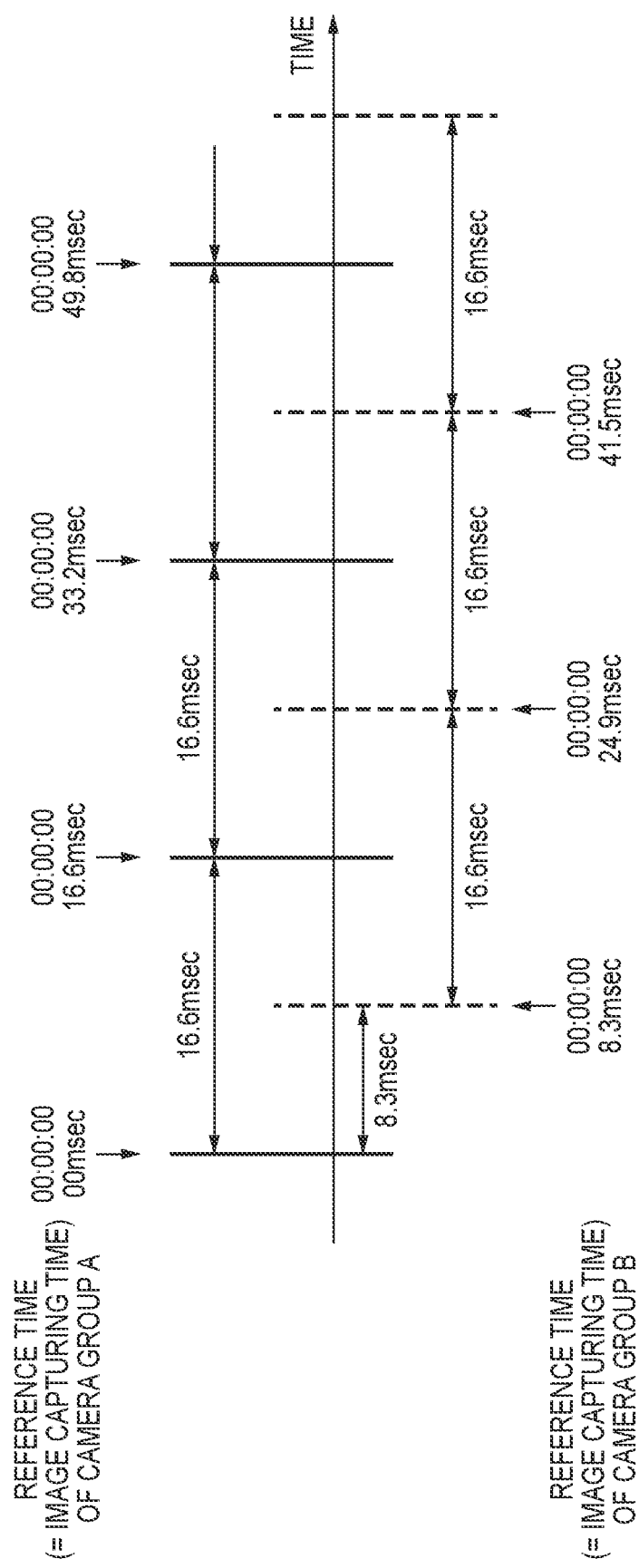
FIG. 7 is a view illustrating an example of reference times set to camera groups.

FIG. 7 illustrates the reference time of the cameras belonging to the camera group A and the reference time of the cameras belonging to the camera group B with the horizontal axis as time. Both cameras capture every 16.6 milliseconds, but the image capturing times of camera group A and camera group B are shifted by 8.3 milliseconds, which is half the time of 16.6 milliseconds. Thus, each of the camera group A and the camera group B performs capturing every 16.6 milliseconds, that is, at 60 Hz, but when the camera group A and the camera group B are viewed together, capturing is performed at an image capturing interval of 8.3 milliseconds, that is, at 120 Hz.

As described above, the time setting unit 203 outputs information indicating the determined reference time to a camera so that the camera repeats capturing at a predetermined image capturing period with the designated reference time as the start. Each camera repeats capturing at an image capturing period (e.g., 16.6 milliseconds) starting with the notified reference time. Note that the setting of the reference time to the camera by the time setting unit 203 is not limited to this. For example, the time setting unit 203 may output information indicating a plurality of reference times obtained by adding a predetermined image capturing period to the determined reference time so that capturing at a predetermined image capturing period is realized by executing capturing at designated reference times. For example, the time setting unit 203 may output information indicating a plurality of reference times to a camera such as 00:00:00 00 msec, 00:00:00 16.6 msec, 00:00:00 33.2 msec, . . . , and so on.

Figure 8:
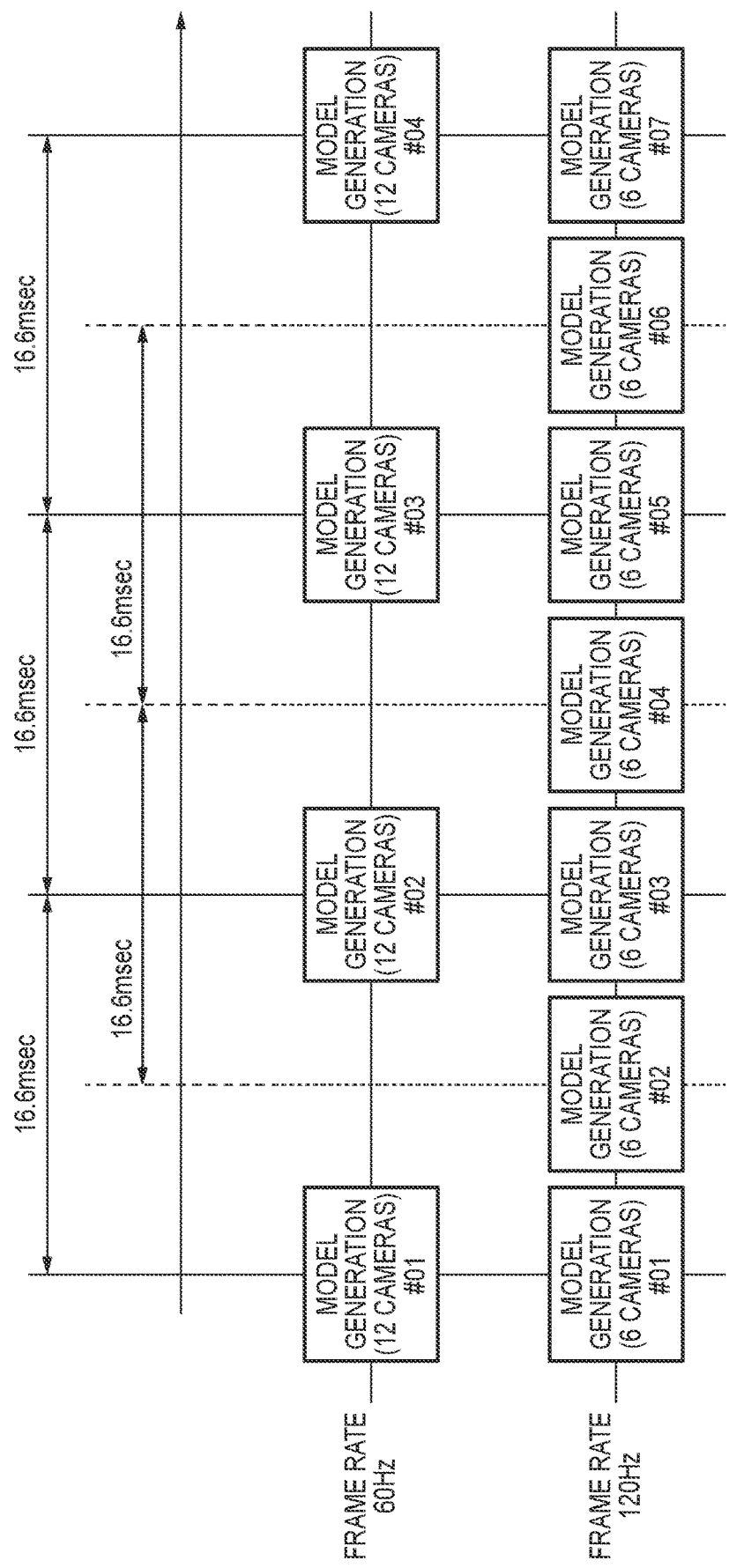
FIG. 8 is a diagram for describing processing of the image generating apparatus according to the first embodiment.

With FIG. 8, description is given regarding the generation timing of a three-dimensional model performed by the image generating apparatus 122 when the frame rate is 60 Hz or 120 Hz. In the first embodiment, when the frame rate is 60 Hz, all of the cameras 301 to 312 perform capturing at the same reference time, so that a three-dimensional model that uses 12 cameras is generated at 60 Hz. In contrast, when the frame rate is 120 Hz, as described with reference to FIG. 7, the two camera groups capture in a state in which the reference time is shifted therebetween, so that three-dimensional model generation in accordance with six cameras is performed at 120 Hz.

As described above, according to the first embodiment, it is possible to set camera groups according to the frame rate and to perform capturing by assigning different reference times to respective camera groups. Thus, it is possible to generate a virtual viewpoint image with an improved frame rate, and it is possible to effectively utilize a plurality of cameras.

In the present embodiment, the description has been made with two camera groups, but a higher frame rate can be realized by dividing cameras into camera groups according to a frame rate of the virtual viewpoint image to be generated. For example, in the case of generating a virtual viewpoint image of 240 Hz, it can be realized by having four camera groups and performing capturing after setting different respective reference times.

That is, when a plurality of camera groups are included in the set of camera groups managed by the setting control unit 201, a number of reference times set is equal to the number of camera groups. When the image capturing period of the camera included in the set is T and the number of camera groups is n, the setting control unit 201 determines the reference times of respective camera groups included in the set as times respectively shifted by T/n. For example, when the frame rate of the camera is 60 Hz (image capturing period T=16.6 ms) and the number n of camera groups=4, a virtual viewpoint image can be generated at a frame rate of 240 Hz by setting reference times shifted by T/n=4.18 ms to respectively camera groups.

In the above embodiment, the number of camera groups when the frame rate is prioritized is 2, and the number of camera groups when the image quality (accuracy of a three-dimensional model) is prioritized is 1, but there is no limitation to this. It is sufficient if the number of camera groups in a case where the frame rate is prioritized is larger than the number of camera groups in a case where the accuracy of the three-dimensional model is prioritized.

In the present embodiment, description was given assuming that the number of cameras belonging to each camera group are equal, but there is no limitation to this. However, in order to align the accuracy of the generated three-dimensional model for each group, it is desirable that the number of cameras belonging to each camera group is the same number.

Second Embodiment

The second embodiment will be described with reference to the drawings. The second embodiment is an example in which a user can arbitrarily change the frame rate of the virtual viewpoint image by setting the frame rate. Note that the configuration of the image generating system according to the second embodiment is similar to that of the first embodiment (FIG. 1).

Figure 9:
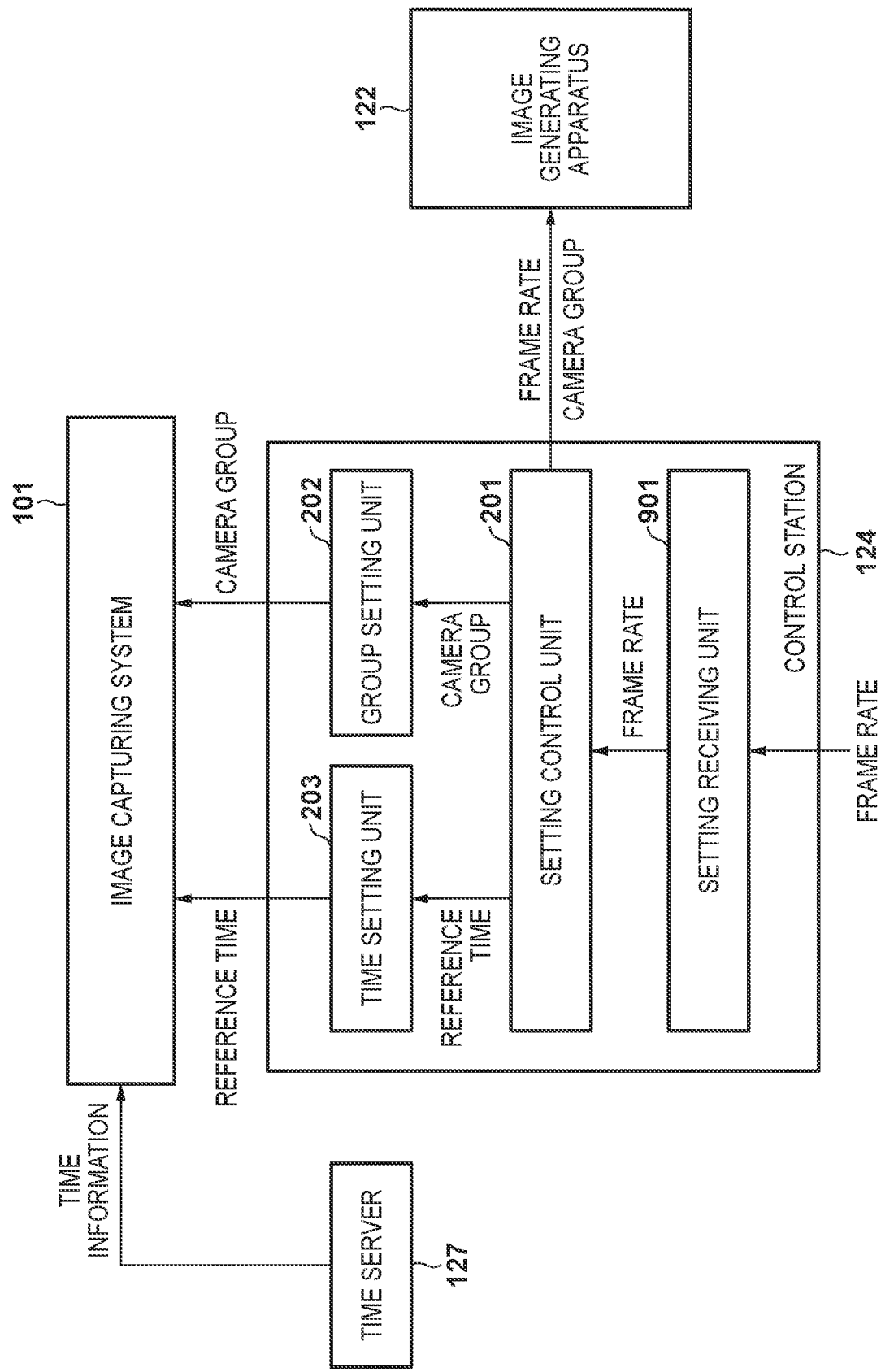
FIG. 9 is a block diagram illustrating an example of a functional configuration of a control station according to a second embodiment.

FIG. 9 is a block diagram illustrating an example of a functional configuration of the control station 124 according to a second embodiment. Functional blocks similar to those of the first embodiment (FIG. 2) are given the same reference numerals. In FIG. 9, a user setting receiving unit 901 is an interface for accepting a user instruction from, for example, the virtual camera operation UI 125 at the control station 124. In the second embodiment, the user setting receiving unit 901 accepts, from the user, the frame rate of a virtual viewpoint image to be generated.

Figure 10:
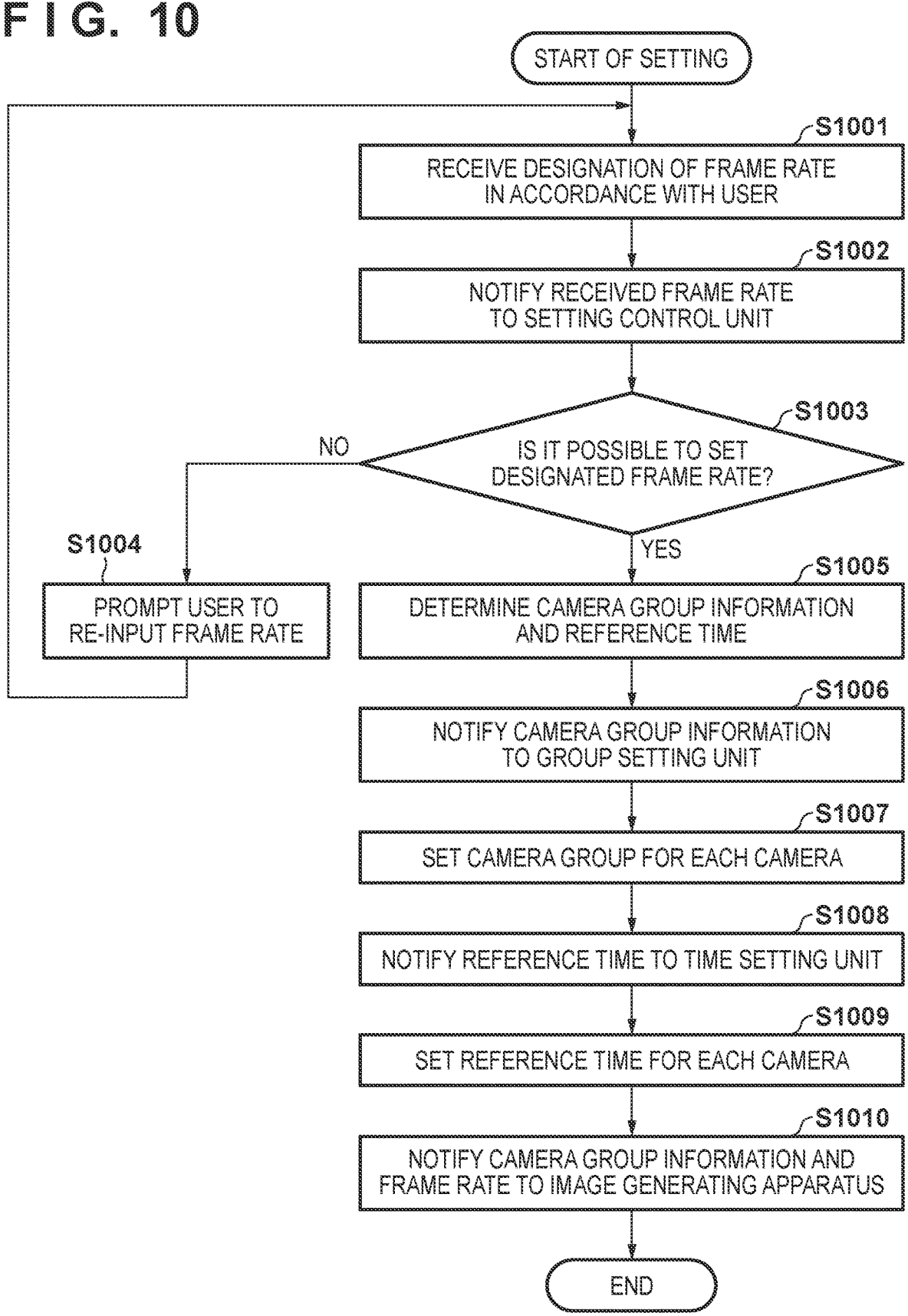
FIG. 10 is a flowchart for describing processing for setting a frame rate according to the second embodiment.

Next, processing for setting the frame rate according to the second embodiment will be described with reference to FIG. 10. FIG. 10 is a flowchart illustrating processing for setting a frame rate of a virtual viewpoint image according to the second embodiment.

The user setting receiving unit 901 receives the frame rate of images from the user in step S1001, and then notifies the received frame rate to the setting control unit 201 in step S1002. In step S1003, the setting control unit 201 determines whether or not setting of the designated frame rate is possible. For example, when the designated frame rate exceeds a frame rate that can be realized by the maximum number of camera groups managed, the setting control unit 201 determines that the setting is impossible. In the case of the table 501 of FIG. 5A, a frame rate that can be realized is 120 Hz. When it is determined that the designated frame rate cannot be set, in step S1004, the setting control unit 201 prompts the user to re-input the frame rate so as to designate another frame rate, and repeats the processing from step S1001. Note that input and re-input of the frame rate by a user can be executed using an operation panel (not illustrated).

Meanwhile, when the designated frame rate is equal to or less than the frame rate that can be realized by the maximum number of camera groups managed by the setting control unit 201, it is determined that the frame rate can be set, and the processing proceeds from step S1003 to step S1005. In step S1005, the setting control unit 201 determines the group information and reference times of the cameras in accordance with the frame rate notified in step S1002. For example, when the camera groups are managed using the table 501 illustrated in FIG. 5A, the user can designate any frame rate of 120 Hz or less. If the designated frame rate is 60 Hz or less, the setting control unit 201 employs the set for the 60 Hz frame rate (a set consisting of one camera group) and a reference time corresponding to the set. If the designated frame rate is greater than 60 Hz and less than or equal to 120 Hz, the setting control unit 201 employs the set for the 120 Hz frame rate (the set consisting of two camera groups) and a reference time corresponding to the set. That is, the setting control unit 201 selects a set corresponding to a frame rate which is equal to or higher than the frame rate designated by the user operation and which is closest to the designated frame rate from a plurality of sets.

Next, in step S1006, the setting control unit 201 notifies the group setting unit 202 of the camera group information determined in step S1005. In step S1007, the group setting unit 202, in accordance with the camera group information notified in step S1006, sets a camera group to each camera of the image capturing system 101. Next, in step S1008, the setting control unit 201 notifies the time setting unit 203 of the reference times determined in step S1005. In step S1009, the time setting unit 203 sets the reference times notified in step S1008 to the respective cameras of the image capturing system 101. In step S1010, the setting control unit 201 notifies the image generating apparatus 122 of the frame rate notified in step S1002, the camera group information determined in step S1005, and the frame rate corresponding to the camera group information.

The image generating apparatus 122 collects multi-viewpoint images and generates a virtual viewpoint image in accordance with the notified frame rate and camera group. For example, the image generating apparatus 122 generates a virtual viewpoint image based on the camera group and the frame rate corresponding to the camera group. For example, when the sets of the camera groups A and B illustrated in the table 501 of FIG. 5A are employed, the image generating apparatus 122 generates a virtual viewpoint image having a frame rate of 120 Hz, and then converts the virtual viewpoint image to have the frame rate designated by the user. In this manner, a virtual viewpoint image having the frame rate designated by the user is generated.

As described above, according to the second embodiment, it is possible to change the frame rate of the virtual viewpoint image based on an instruction from the user. Therefore, the user can change the frame rate of the virtual viewpoint image to a desired frame rate for each scene, for example.

As described above, according to the above embodiment, by setting different reference times for each of the plurality of camera groups and performing capturing, it is possible to generate a final virtual viewpoint image at a frame rate higher than the frame rate of the cameras.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-024695, filed Feb. 14, 2019, which is hereby incorporated by reference herein in its entirety.

What is claimed is:

1. A control apparatus comprising:
one or more processors that execute instructions stored in one or more memories to:
manage a plurality of sets of one or more groups to which a plurality of image capturing apparatuses belong, each of the plurality of sets including a different number of groups;
select a set from the plurality of sets in accordance with a user operation;
determine, based on the number of one or more groups, respectively different reference times for the one or more groups; and
control the plurality of image capturing apparatuses that belong to the one or more groups included in the selected set so that the plurality of image capturing apparatuses execute image capturing according to the determined reference times.

2. The apparatus according to claim 1, wherein in a case where an image capturing period of the plurality of image capturing apparatuses is T and the number of the one or more groups is n, one or more processors determine the respective reference times of the groups as times shifted by T/n.

3. The apparatus according to claim 1, wherein the one or more processors set the determined reference times to the plurality of image capturing apparatuses as a capturing start time so that each the plurality of image capturing apparatuses repeats capturing at a predetermined image capturing period with the set capturing start time as a start.

4. The apparatus according to claim 1, wherein the one or more processors set, to the plurality of image capturing apparatuses, a plurality of capturing times obtained by repeatedly adding a predetermined image capturing period to the determined reference times to realize capturing at the predetermined image capturing period by each of the plurality of image capturing apparatuses executing capturing at the plurality of capturing times.

5. The apparatus according to claim 1, wherein:
each of the plurality of sets correspond to a different frame rate, and
the one or more processors select, from the plurality of sets, a set corresponding to a frame rate designated by a user operation.

6. The apparatus according to claim 5, wherein the one or more processors select the set corresponding to the frame rate that is equal to or higher than the frame rate designated by the user operation and that is closest to the designated frame rate.

7. The apparatus according to claim 1, wherein the plurality of sets include a first set used in a case where a frame rate is prioritized, and a second set used in a case where an accuracy of a three-dimensional model is prioritized.

8. The apparatus according to claim 7, wherein the number of the groups included in the first set is larger than the number of the groups included in the second set.

9. The control apparatus according to claim 8, wherein the number of the groups included in the first set is one.

10. An image generating system comprising:
one or more processors that execute instructions stored in one or more memories to:
manage a plurality of sets of one or more groups to which a plurality of image capturing apparatuses belong, each of the plurality of sets including a different number of groups;
select a set from the plurality of sets in accordance with a user operation;
determine, based on the number of the one or more groups, respectively different reference times for the one or more groups;
control the plurality of image capturing apparatuses that belong to the one or more groups included in the selected set so that the plurality of image capturing apparatuses execute image capturing according to the reference times determined by the determining unit; and
generate an image corresponding to a designated viewpoint based on images obtained by the plurality of image capturing apparatuses.

11. The system according to claim 10, wherein:
one or more processors determine the reference time so that each of the one or more groups executes capturing at a predetermined frame rate, and
the one or more processors sequentially generate images corresponding to the designated viewpoint based on a group of images acquired from the plurality of groups.

12. A control method comprising:
managing a plurality of sets of one or more groups to which a plurality of image capturing apparatuses belong, each of the plurality of sets including a different number of groups;
selecting a set from the plurality of sets in accordance with a user operation;
determining, based on the number of one or more groups, respectively different reference times for the one or more groups; and
controlling the plurality of image capturing apparatuses that belong to the one or more groups included in the selected set so that the plurality of image capturing apparatuses execute image capturing according to the determined reference times.

13. The method according to claim 12, wherein in a case where an image capturing period of the plurality of image capturing apparatuses is T and the number of the one or more groups is n, the respective reference times of the groups are determined as times shifted by T/n.

14. The method according to claim 12, wherein the controlling of the plurality of image capturing apparatuses includes setting the determined reference times to the plurality of image capturing apparatuses so that each of the plurality of image capturing apparatuses repeats capturing at a predetermined image capturing period starting with a designated reference time.

15. The method according to claim 12, wherein the controlling of the plurality of image capturing apparatuses includes setting, to the plurality of image capturing apparatuses, a plurality of reference times obtained by adding a predetermined image capturing period to the determined reference times so that capturing of the predetermined image capturing period is realized by each of the plurality of image capturing apparatuses executing capturing at a designated reference time.

16. An image generation method comprising:
managing a plurality of sets of one or more groups to which a plurality of image capturing apparatuses belong, each of the plurality of sets including a different number of groups;
selecting a set from the plurality of sets in accordance with a user operation;
determining, based on the number of one or more groups, respectively different reference times for the one or more groups;
controlling the plurality of image capturing apparatuses that belong to the one or more groups included in the selected set so that the plurality of image capturing apparatuses execute image capturing according to the determined reference times; and
generating an image corresponding to a designated viewpoint based on images obtained by the plurality of image capturing apparatuses.

17. The method according to claim 16, wherein:
the determining of the reference times determines the reference times so that each of the one or more groups executes capturing at a predetermined frame rate, and the generating of the image sequentially generates images corresponding to the designated viewpoint based on a group of images acquired from the plurality of groups.

18. A non-transitory computer-readable medium storing programs executable by a computer to execute a control method comprising:
managing a plurality of sets of one or more groups to which a plurality of image capturing apparatuses belong, each of the plurality of sets including a different number of groups;
selecting a set from the plurality of sets in accordance with a user operation;
determining, based on the number of one or more groups, respectively different reference times for the one or more groups; and
controlling the plurality of image capturing apparatuses that belong to the one or more groups included in the selected set so that the plurality of image capturing apparatuses execute image capturing according to the determined reference times.

* * * * *